United States Patent
Wako et al.

(10) Patent No.: US 9,975,536 B2
(45) Date of Patent: May 22, 2018

(54) ELECTRIC PARKING BRAKE DEVICE

(71) Applicant: Mitsubishi Jidosha Kogyo Kabushiki Kaisha, Tokyo (JP)

(72) Inventors: Takayuki Wako, Tokyo (JP); Shinji Nakagawa, Tokyo (JP); Tomohiro Kawasaki, Tokyo (JP); Mutsuhiro Naka, Tokyo (JP); Naoki Yamamoto, Tokyo (JP); Kazunori Hayakawa, Tokyo (JP); Naoki Watanabe, Tokyo (JP)

(73) Assignee: MITSUBISHI JIDOSHA KOGYO KABUSHIKI KAISHA, Tokyo (JP)

(*) Notice: Subject to any disclaimer, the term of this patent is extended or adjusted under 35 U.S.C. 154(b) by 0 days. days.

(21) Appl. No.: 15/471,285

(22) Filed: Mar. 28, 2017

(65) Prior Publication Data

US 2017/0197605 A1    Jul. 13, 2017

Related U.S. Application Data

(63) Continuation of application No. PCT/JP2015/078395, filed on Oct. 6, 2015.

(30) Foreign Application Priority Data

Dec. 4, 2014    (JP) ................. 2014-246218

(51) Int. Cl.
| | |
|---|---|
| *B60T 17/18* | (2006.01) |
| *B60T 7/04* | (2006.01) |
| *B60T 7/10* | (2006.01) |
| *B60T 13/74* | (2006.01) |
| *B60T 1/14* | (2006.01) |
| *B60Q 1/44* | (2006.01) |

(52) U.S. Cl.
CPC .............. *B60T 17/18* (2013.01); *B60Q 1/441* (2013.01); *B60T 7/04* (2013.01); *B60T 7/107* (2013.01); *B60T 13/741* (2013.01); *B60T 2220/04* (2013.01); *B60Y 2300/30* (2013.01)

(58) Field of Classification Search
CPC . B60T 17/18; B60T 7/04; B60T 7/107; B60T 13/741; B60Q 1/441
USPC ......................................................... 701/70
See application file for complete search history.

(56) References Cited

U.S. PATENT DOCUMENTS

| | | | |
|---|---|---|---|
| 2003/0222774 A1* | 12/2003 | Koenigsberg | ........... B60T 8/885 340/453 |
| 2014/0095045 A1* | 4/2014 | Takagi | ................ B60W 10/184 701/70 |

FOREIGN PATENT DOCUMENTS

| | | |
|---|---|---|
| JP | 2005-96543 A | 4/2005 |
| JP | 2005-297777 A | 10/2005 |
| JP | 2005297777 A * | 10/2005 |

(Continued)

OTHER PUBLICATIONS

EPO translation of JP 2005-297777.*

Primary Examiner — Yazan A Soofi
(74) Attorney, Agent, or Firm — Birch, Stewart, Kolasch & Birch, LLP

(57) ABSTRACT

When a parking brake mechanism is in a braking state and an operation switch is switched to a braking-released state, a control unit of an electric vehicle brings a parking brake mechanism into a braking-released state on the condition that the control unit detects using a stop lamp switch that the brake pedal is not depressed and detects that the shift range of the shift lever is a P range.

6 Claims, 5 Drawing Sheets

(56) References Cited

FOREIGN PATENT DOCUMENTS

| JP | 2007-55355 A | 3/2007 |
|---|---|---|
| JP | 2007-216896 A | 8/2007 |

\* cited by examiner

ELECTRIC PARKING BRAKE DEVICE

This application is a Continuation of PCT International Application No. PCT/JP2015/078395, filed on Oct. 6, 2015, which claims priority under 35 U.S.C. 119(a) to Patent Application No. 2014-246218, filed in Japan on Dec. 4, 2014, all of which are hereby expressly incorporated by reference into the present application.

TECHNICAL FIELD

The present invention relates to an electric parking brake device.

BACKGROUND ART

Conventionally, there has been known an electric parking brake system including an electric motor which operates in response to a driver's switch operation, and a parking brake mechanism which applies a braking force to a wheel as result of operation of the electric motor (see, for example, Patent Document 1). Such an electric parking brake system allows a driver to easily bring the parking brake mechanism into a braking state by merely operating the switch when the vehicle is stopped or parked.

The electric parking brake system of Patent Document 1 performs control of bringing the parking brake mechanism into a braking-released state when it detects that the brake pedal is depressed. Namely, in the case where the parking brake mechanism is in its braking state, when the driver mistakenly operates the switch in a state in which the driver does not depress the brake pedal, the parking brake mechanism is not brought into the braking-released state. Thus, it is possible to prevent occurrence of a situation in which the parking brake mechanism comes into the braking-released state without the driver's awareness.

However, in the case where a device or the like for detecting whether or not the brake pedal is pressed is broken, the driver cannot release the parking brake even when the driver operates the switch while depressing the brake pedal. In such case, the driver must manually release the parking brake mechanism from the braking state, which forces the driver to perform a troublesome operation.

Also, the conventional electric parking brake system cannot meet the demand of releasing the braking of the parking brake mechanism in a state in which the brake pedal is not depressed, if safety is secured, even in the case where the device or the like for detecting whether or not the brake pedal is pressed is not broken.

PRIOR ART DOCUMENT

Patent Document

Patent Document 1: Japanese Patent Application Laid-Open (kokai) No. 2005-096543

SUMMARY OF THE INVENTION

Problem to be Solved by the Invention

The present invention has been accomplished in the view of the forgoing circumstances, and its object is to provide an electric parking brake device which can safely switch a parking brake mechanism from a braking state to a braking-released state without forcing a driver to perform a troublesome operation.

Means for Solving the Problem

A first mode of the present invention which solve the above-described problem is an electric parking brake device comprising: a pedal state detector which detects an operation state of a brake pedal; a shift range detector which detects a shift range of a shift lever; a parking brake mechanism which can bring a wheel into a braked state or a braking-released state; an operation switch which switches the parking brake mechanism to a braking state or a braking-released state; and a controller which controls braking operation of the parking brake mechanism in accordance with an operation of the operation switch, wherein when the parking brake mechanism is in the braking state and the operation switch is operated for switching to the braking-released state, the controller brings the parking brake mechanism into the braking-released state on the condition that the controller detects, using the pedal state detector, that the brake pedal is not depressed and detects, using the shift range detector, that the shift range of the shift lever is in a parking range.

In such a first mode, the braking of the parking brake mechanism can be released in a state in which the brake pedal is not depressed, because the shift range is in the parking range and safety can be secured even when the parking brake mechanism is brought into the braking-released state.

Also, for example, even in the case where the controller determines that the brake pedal is not depressed, despite the brake pedal being depressed, because of a failure of the pedal state detector, the electric parking brake device can bring the parking brake mechanism into the braking-released state on the condition that the shift range is the parking range. As a result, it is possible to avoid the necessity of forcing the driver to manually bring the parking brake mechanism into the braking-released state.

A second mode of the present invention is an electric parking brake device according to the first mode, further comprising a notifier which notifies a driver with a piece of information, wherein when the controller detects, using the pedal state detector, that the brake pedal is not depressed, the controller notifies, using the notifier, the driver with a piece of information for causing the driver to depress the brake pedal.

In such a second mode, as a result of providing the driver with the information for causing the driver to depress the brake pedal, the conditions for bringing the parking brake mechanism into the braking-released state are satisfied more easily.

A third mode of the present invention is an electric parking brake device according to the first or second mode, wherein the pedal state detector includes a stop lamp switch which turns a stop lamp on when the brake pedal is depressed and turns the stop lamp off when the brake pedal is not depressed, and the controller determines whether or not the brake pedal is depressed by determining whether the stop lamp switch is on or off.

In such a third mode, the controller can easily determine whether or not the brake pedal is depressed, on the basis of the results of determination as to whether the stop lamp switch is on or off.

A fourth mode of the present invention is an electric parking brake device according to the third mode, wherein the controller notifies, using the notifier, the driver with a piece of information for causing the driver to change the shift range of the shift lever to the parking range, on the condition that the pressure of brake oil is equal to or higher than a predetermined threshold and the stop lamp switch is off.

In such a fourth embodiment, it is possible to avoid a situation in which the parking brake mechanism is not released at all even through the driver has depressed the brake pedal, and if the driver acts in accordance with the information for causing the driver to change the shift range to the parking range, the driver can bring the parking brake mechanism into the braking-released state in a safe state in which the automobile does not start moving.

Effect of the Invention

According to the present invention, there is provided an electric parking brake device which can safely switch the parking brake mechanism from the braking state to the braking-released state without forcing a driver to perform a troublesome operation.

MODE FOR CARRYING OUT THE INVENTION

Below, embodiments for implementing the present invention will be described. Notably, description of the embodiments is illustrative, and the present invention is not limited to the following description.

First Embodiment

Figure 1:
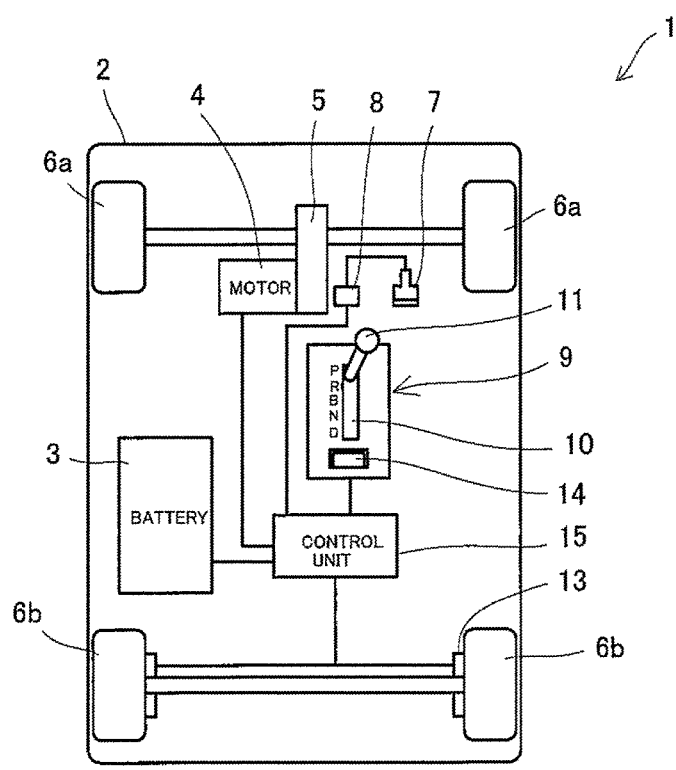
FIG. 1 is a schematic view showing the configuration of an electric parking brake device according to a first embodiment.

FIG. 1 is a schematic view showing the configuration of an electric parking brake device according to the present embodiment. An electric vehicle 2, which is an example of a vehicle including an electric parking brake device 1 according to the present embodiment, include a battery 3 which is a secondary battery, and a motor for travelling (drive apparatus) 4 which operates using electric power supplied from the battery 3. The motor for travelling 4 is connected to drive wheels (front wheels in the present embodiment) 6a via a drive mechanism 5. The motor for travelling 4 drives the drive wheels 6a through the drive mechanism 5. Meanwhile, during regeneration operation, the motor for travelling 4 generates electric power upon receipt of rotation from the drive wheels 6a and supplies the electric power to the battery 3. A control unit 15, which will be described later, properly controls the operation (output) of the motor for travelling 4; i.e., the supply of electric power from the battery 3 to the motor for travelling 4.

The electric parking brake device 1 provided in such an electric vehicle 2 includes a stop lamp switch 8 (an example of a pedal state detector), a shift lever apparatus 9 (an example of a shift range detector which detects the shift range), a parking brake mechanism 13, an operation switch 14, and a control unit 15 (an example of a controller).

A brake pedal 7 is provided in the electric vehicle 2. Further, the stop lamp switch 8 is provided in the electric vehicle 2 as an example of the pedal state detector which detects the operation state of the brake pedal 7, namely whether or not a driver depresses the brake pedal 7. The stop lamp switch 8 is a switch for turning a stop lamp (not shown) on when the brake pedal 7 is depressed and turning the stop lamp off when the brake pedal 7 is not depressed. The state in which the stop lamp switch 8 is turned on or off can be detected by the control unit 15, which will be described later. The control unit 15 can easily determine whether or not the brake pedal 7 is depressed by determining whether or not the stop lamp switch 8 is on or off.

Notably, the pedal state detector is not limited to the stop lamp switch 8 and may be any of other devices which can detect whether or not the brake pedal is depressed. For example, the pedal state detector may be a brake switch. The brake switch is a switch which turns on when the brake pedal 7 is depressed and turns off when the brake pedal 7 is not depressed. Another example of the pedal state detector is a device which uses an oil pressure sensor for detecting the oil pressure of the brake and which determines whether or not the brake pedal 7 is depressed by determining whether or not the oil pressure is equal to or higher than a predetermined pressure. Still another example of the pedal state detector is a device which uses a stroke sensor provided for the brake pedal 7 and which determines whether or not the brake pedal 7 is depressed by determining whether or not the amount of stroke is equal to or greater than a predetermined amount.

Also, the shift lever apparatus 9 is provided in the electric vehicle 2. The shift lever apparatus 9 includes a shift lever 11 which moves along a straight shift path 10. When the driver operates and moves the shift lever 11 to a desired shift range, the operation state of the motor for travelling 4 is switched.

The shift lever apparatus 9 according to the present embodiment has, as shift ranges, a drive range (D range), a regeneration range (B range; also called "brake range"), a reverse range (R range), a neutral range (N range), and a parking range (P range). In the D range, the electric vehicle 2 travels forward through use of the power of the motor for travelling 4. In the B range, the electric vehicle 2 travels forward as in the case of the D range; however, the braking force generated as a result of regeneration braking by the motor for travelling 4 is larger than that in the D range. Namely, when the accelerator pedal is returned, a greater deceleration is attained as compared with the D range. In the R range, the electric vehicle 2 travels backward. In the N range (i.e., in a neutral state), the power of the motor for travelling 4 is not transmitted to the drive wheels 6a. In the P range, the drive wheels 6a are fixed so as to prevent the electric vehicle 2 from moving.

The shift ranges; i.e., the P range, the R range, the B range, the N range, and the D range, are disposed, along a straight line, in this order from the front side of the electric vehicle 2. The shift lever apparatus 9 includes a position sensor (not shown) for detecting the position of the shift lever 11. The shift range in which the shift lever 11 is located can be detected by the control unit 15 to be described later. The shift lever apparatus 9 configured to allow the control unit 15 to detect the shift range of the shift lever 11 corresponds to the shift range detector in claims.

The parking brake mechanism 13 is a mechanism which can bring rear wheels 6b (vehicle wheels) into a braked state or a braking-released state. In the present embodiment, the parking brake mechanism 13 includes electric motors (not shown) which operate on the basis of a control signal from the control unit 15, and brake mechanisms (not shown) which apply braking forces to the rear wheels 6b as a result of operation of the electric motors.

The operation switch 14 is a switch used for switching the parking brake mechanism 13 to a braking state or a braking-released state. The operation switch 14 is disposed, for example, near the shift lever apparatus 9 and is composed of a single momentary switch (seesaw switch). The momentary switch is a switch configured such that it can be switched to two positions; i.e., a braking position and a braking-releasing position, by an operation of pushing (pulling) one side of a knob or the like which provides a seesaw operation. Of course, no particular limitation is imposed on the shape and type of the operation switch 14, and it is sufficient that the operation switch 14 has a configuration which allows the driver to switch the operation switch 14 to either of at least two positions; i.e., the braking position and the braking-releasing position.

Notably, the operation switch 14 is configured to allow the control unit 15, which will be described later, to detect the position (the braking position or the braking-releasing position) to which the operation switch 14 is switched.

The control unit 15 is configured as, for example, a built-in electronic device or an LSI device in which a microprocessor, a ROM, a RAM, etc., are integrated, and is connected to a communication line of an in-vehicle network provided in the vehicle. Notably, various well known electronic controllers, such as a brake controller, a transmission controller, a vehicle stability controller, an air-conditioner controller, and an electrical equipment controller, are connected to the in-vehicle network such that they can communicate with one another. Notably, the control of the parking brake mechanism 13 by the control unit 15 may be realized by an electronic circuit (hardware) or software.

The control unit 15, which is connected to the stop lamp switch 8, the shift lever apparatus 9, the parking brake mechanism 13, and the operation switch 14, can detect their states and control them in accordance with their operation states.

When the driver brings the parking brake mechanism 13 into the braking state, the driver switches the operation switch 14 to the braking position. When the driver brings the parking brake mechanism 13 into the braking-released state, the driver switches the operation switch 14 to the braking-releasing position.

When the operation switch 14 is operated as described above, the control unit 15 performs control of bringing the parking brake mechanism 13 into the braking state or the braking-released state on the basis of the state of the brake pedal 7 and the shift range of the shift lever 11.

Figure 2:
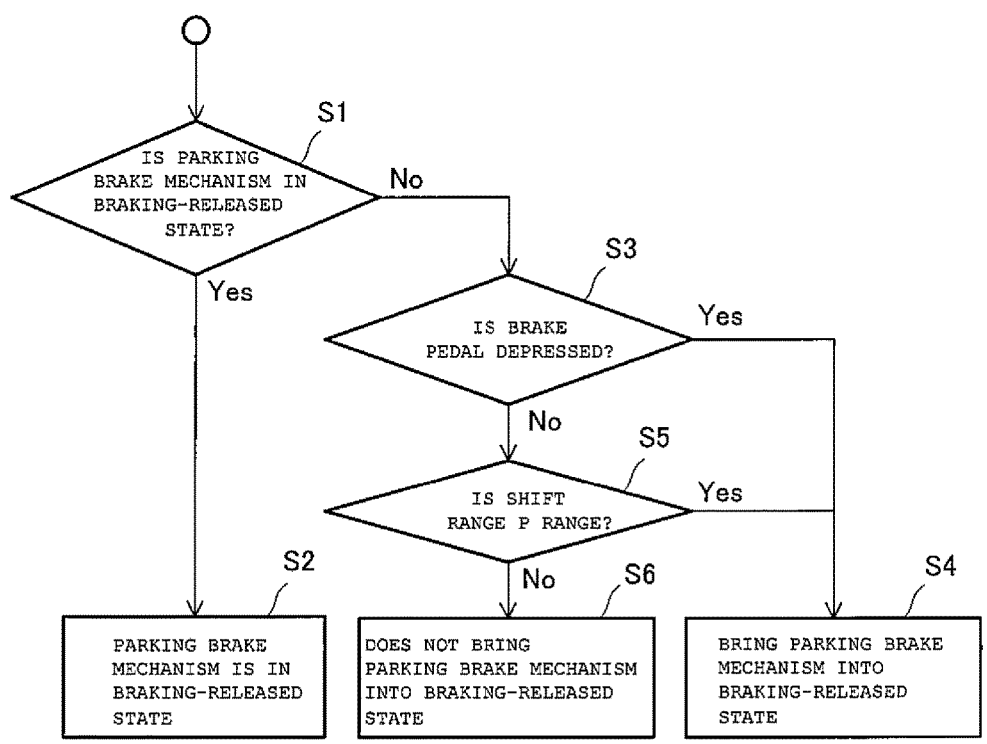
FIG. 2 is a flowchart showing the processing of the electric parking brake device according to the first embodiment.

Next, the control of the parking brake mechanism 13 by the control unit 15 will be described. FIG. 2 is a flowchart showing the processing of the electric parking brake device 1 of the present embodiment.

The control unit 15 performs the following processing every time the driver operates the operation switch 14 for switching to the braking-releasing position. First, the control unit 15 determines whether or not the parking brake mechanism 13 is in the braking-released state (step S1). In the case where the parking brake mechanism 13 is in the braking-released state (step S1; Yes), the control unit 15 determines that the parking brake mechanism 13 is already in the braking-released state and ends the processing (step S2).

In the case where the parking brake mechanism 13 is not in the braking-released state; i.e., is in the braking state (step S1; No), the control unit 15 determines whether or not the brake pedal 7 is depressed (step S3). In the present embodiment, the control unit 15 determines that the brake pedal 7 is depressed if the stop lamp switch 8 is on, and determines that the brake pedal 7 is not depressed if the stop lamp switch 8 is off.

In the case where the brake pedal 7 is depressed (step S3; Yes), the control unit 15 brings the parking brake mechanism 13 into the braking-released state (step S4). Namely, in response to the driver's operation of switching the operation switch 14 to the braking-releasing position, the control unit 15 brings the parking brake mechanism 13 into the braking-released state. Since the control unit 15 brings the parking brake mechanism 13 into the braking-released state on the condition that the parking brake mechanism 13 is in the braking state and the brake pedal 7 is depressed, the braking of the parking brake mechanism 13 can be released in a safe state in which the electric vehicle 2 is stopped.

Meanwhile, in the case where the brake pedal 7 is not depressed (step S3; No), the control unit 15 determines whether or not the shift range is the P range (step S5). In the present embodiment, the control unit 15 determines whether or not the shift range of the shift lever 11 is the P range through use of the position sensor of the shift lever apparatus 9, In the case where the shift range is the P range (step S5; Yes), the control unit 15 brings the parking brake mechanism 13 into the braking-released state (step S4). Namely, in response to the driver's operation of switching the operation switch 14 to the braking-releasing position, the control unit 15 brings the parking brake mechanism 13 into the braking-released state. Since the control unit 15 brings the parking brake mechanism 13 into the braking-released state on the condition that the parking brake mechanism 13 is in the braking state and the shift range is the P range although the brake pedal 7 is not depressed, the braking of the parking brake mechanism 13 can be released in a safe state in which the electric vehicle 2 is stopped.

Meanwhile, in the case where the shift range is not the P range (step S5; No), the control unit 15 does not bring the parking brake mechanism 13 into the braking-released state (step S6). Namely, despite the driver's operation of switching the operation switch 14 to the braking-releasing position, the control unit 15 does not bring the parking brake mechanism 13 into the braking-released state and maintains the braking state. By performing such a control, it is possible to prevent the electric vehicle 2 from moving immediately after the braking of the parking brake mechanism 13 is released in response to the driver's operation.

As described above, in the electric parking brake device 1 according to the present embodiment, the control unit 15 can bring the parking brake mechanism 13 into the braking-released state, on the condition that the shift range is the P range (step S5; Yes), even in the case where the parking brake mechanism 13 is in the braking state (step S1; No) and the control unit 15 determines that the brake pedal 7 is not depressed (step S3; No), despite the brake pedal 7 being depressed, because of a failure of the stop lamp switch 8 used for determination of depressing of the brake pedal 7. As a result, it is possible to avoid the necessity of forcing the driver to manually bring the parking brake mechanism into the braking-released state.

Needless to say, even in the case where the stop lamp switch 8 does not fail, the control unit 15 brings the parking brake mechanism 13 into the braking-released state on the condition that the shift range is the P range. Namely, it is possible to meet a driver's desire to cancel the braking of the parking brake mechanism 13 in the state in which the brake pedal 7 is not depressed, because safety can be secured even when the parking brake mechanism 13 is brought into the braking-released state.

Second Embodiment

The electric parking brake mechanism according to the first embodiment determines whether or not the shift range is the P range (step S5) in the case where the brake pedal 7 is not depressed (step S3; No). However, the electric parking brake mechanism may prompt the driver to depress the brake pedal 7.

Figure 3:
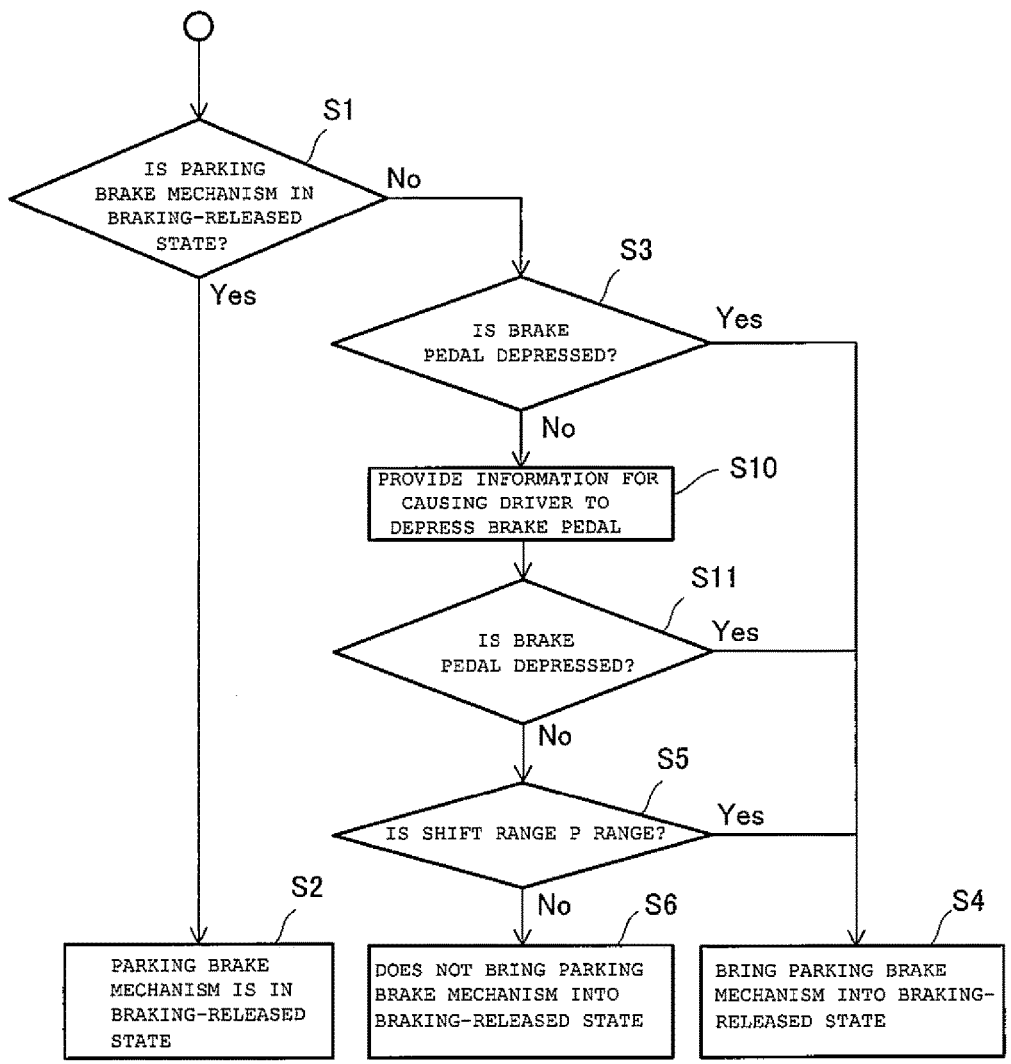
FIG. 3 is a flowchart showing the processing of an electric parking brake device according to a second embodiment.

FIG. 3 is a flowchart showing the processing of an electric parking brake device 1 according to the present embodiment. Notably, the configuration of the electric parking brake device 1 according to the present embodiment is identical with that of the first embodiment. The description of the processing which is the same as that in the first embodiment will not be repeated, and the processing different from that in the first embodiment will be described.

The control unit 15 performs the following processing every time the driver operates the operation switch 14 for switching to the braking-releasing position. The processing of step S1 to step S3 and the processing of step S4 (performed in the case where the result of the determination in step S3 is "Yes") are the same as those in the first embodiment.

In the case where the brake pedal 7 is not depressed (step S3; No), the control unit 15 provides a piece of information for causing the driver to depress the brake pedal (hereinafter the piece of information will be also referred to as a "braking prompting message") (step S10). Specifically, the control unit 15 causes a notifier provided in the electric vehicle 2 to notify the braking prompting message. Examples of the notifier include an acoustic device, such as a speaker, for generating a sound within the electric vehicle 2 and an information display device such as a liquid crystal display. The braking prompting message is a piece of information for instructing the driver to depress the brake pedal 7. For example, the information is a piece of information which can be recognized through the driver's sense such as the sense of hearing and the sense of sight; for example, a voice or character information for conveying a message "Please depress the brake pedal." The braking prompting message is stored as electronic data in, for example, a storage device of the acoustic device or the information display device in advance, and is produced from the acoustic device or is displayed on the information display device on the basis of the control signal from the control unit 15.

Since the braking prompting message is conveyed to the driver through the notifier, it is expected that the driver depresses the brake pedal 7.

After elapse of a predetermined period of time, for example, after providing the braking prompting message, the control unit 15 again determines whether or not the brake pedal 7 is depressed (step S11). In the case where the brake pedal 7 is depressed (step S11; Yes), the control unit 15 brings the parking brake mechanism 13 into the braking-released state (step S4).

In the case where the brake pedal 7 is not depressed (step S11; No), as in the first embodiment, the control unit 15 determines whether or not the shift range is the P range (step S5). In accordance with the result of the determination, the control unit 15 cancels the braking of the parking brake mechanism 13 (step S5; Yes to step S4) or maintains the braking (step S5; No to step S6).

Notably, in the present embodiment, the re-determination as to whether or not the brake pedal 7 is depressed (step S11) is performed only one time. However, the present invention is not limited to such an embodiment. For example, when the brake pedal 7 is not depressed (step S11; No), the step S10 for providing the braking prompting message may be repeated again. This repetition may be continued until the brake pedal 7 is depressed or until the number of times of repetition reaches a predetermined number.

As described above, in the electric parking brake device 1 according to the present embodiment, in the case where the parking brake mechanism 13 is in the braking state (step S1; No) and the brake pedal 7 is not depressed (step S3; No), the braking prompting message is provided to the driver so as to prompt the driver to depress the brake pedal 7. As a result of the brake pedal 7 being depressed by the driver in response to this braking prompting message (step S11; Yes), the parking brake mechanism 13 can be brought into the braking-released state in a safe state in which the electric vehicle 2 does not start moving, irrespective of whether or not the shift range is the P range.

Namely, as a result of provision of the braking prompting message to the driver, the conditions for bringing the parking brake mechanism 13 into the braking-released state are satisfied more easily.

Third Embodiment

In the present embodiment, there is described an electric parking brake mechanism which determines the case where the brake pedal 7 is depressed but the stop lamp switch 8 (the pedal state detector) used for determining whether or not the brake pedal 7 is depressed is broken. An example of the failure of the stop lamp switch 8 is a failure in which the switch is locked in the off state.

Figure 4:
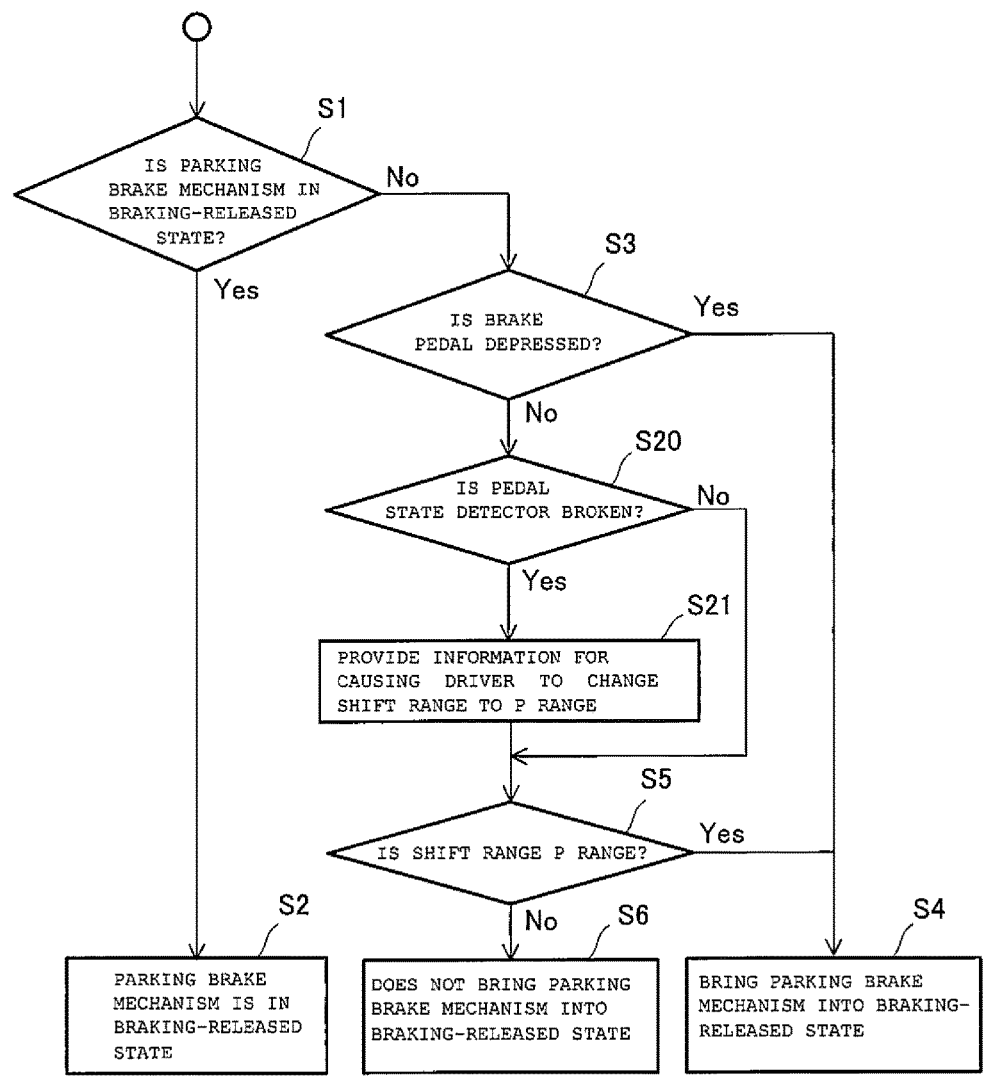
FIG. 4 is a flowchart showing the processing of an electric parking brake device according to a third embodiment.

FIG. 4 is a flowchart showing the processing of an electric parking brake device 1 according to the present embodiment. Notably, the configuration of the electric parking brake device 1 according to the present embodiment is identical with that of the first embodiment. The description of the processing which is the same as that in the first embodiment will not be repeated, and the processing different from that in the first embodiment will be described.

The control unit 15 performs the following processing every time the driver operates the operation switch 14 for switching to the braking-releasing position. The processing of step S1 to step S3 and the processing of step S4 (performed in the case where the result of the determination in step S3 is "Yes") are the same as those in the first embodiment.

In the case where the brake pedal 7 is not depressed (step S3; No), the control unit 15 determines whether or not the pedal state detector is broken (step S20). Specifically, two or more detectors which detects that the brake pedal 7 is depressed are used, and, when the results of the detections by the two or more detectors are inconsistent with one another, the control unit 15 determines that the pedal state detector is broken.

For example, an oil pressure sensor for the brake and the stop lamp switch 8 are used as the pedal state detector. In this case, when the brake oil pressure is equal to or higher than a predetermined threshold and the stop lamp switch 8 is off, the control unit 15 determines that the pedal state detector is broken. When the brake oil pressure is equal to or higher than the predetermined threshold, it is considered that the brake pedal 7 is depressed and the brake functions. Under normal circumstances, the stop lamp switch 8 should be turned on when the brake pedal 7 is depressed. However, if the stop lamp switch 8 is off, it is inconsistent with the result of the determination based on the brake oil pressure. Therefore, the control unit 15 determines that the pedal state detector is broken.

In the case where the pedal state detector is broken (step S20; Yes), the control unit 15 provides, through use of the notifier, the driver with a piece of information for causing the driver to change the shift range of the shift lever to the P range (the parking range) (hereinafter the piece of information will be also referred to as a "parking prompting message") (step S21).

The parking prompting message is a piece of information for instructing the driver to change the shift range of the shift lever 11 to the P range. For example, the information is a piece of information which can be recognized through the driver's sense such as the sense of hearing or the sense of sight; for example, a voice or character information for conveying a message "Please move the shift lever to the P range." The parking prompting message is stored as electronic data in, for example, a storage device of the acoustic device or the information display device in advance, and is produced from the acoustic device or is displayed on the information display device on the basis of the control signal from the control unit 15.

Since the parking prompting message is conveyed to the driver through the notifier, it is expected that the driver moves the shift lever to the P range.

After providing the parking prompting message (step S21), or in the case where the pedal state detector is broken (step S20, Yes), as in the first embodiment, the control unit 15 determines whether or not the shift range is the P range (step S5). In accordance with the result of the determination, the control unit 15 cancels the braking of the parking brake mechanism 13 (step S5; Yes to step S4) or maintains the braking (step S5; No to step S6).

Notably, in the present embodiment, the parking prompting message is provided one time. However, the present invention is not limited to such an embodiment. For example, when the shift range is not the P range (step S5; No), the step S21 for providing the parking prompting message may be repeated again. This repetition may be continued until the shift range becomes the P range or until the number of times of repetition reaches a predetermined number.

As described above, according to the electric parking brake device 1 according to the present embodiment, it is possible to avoid occurrence of a situation in which the parking brake mechanism 13 is in the braking state (step S1; No), and despite the brake pedal 7 being depressed (step S3; Yes), the control unit 15 determines that the brake pedal 7 is not depressed, because of a failure of the pedal state detector. In this case, the driver is prompted to quickly change the shift range to the P range.

By virtue of such a control, it is possible to avoid a situation in which the parking brake mechanism 13 is not released at all even through the driver has depressed the brake pedal 7, and if the driver acts in accordance with the braking prompting message, the parking brake mechanism 13 can be brought into the braking-released state in a safety state in which the electric vehicle 2 does not start moving.

Fourth Embodiment

In the above-described first through third embodiments, the shift lever apparatus 9 to which the slide-type shift lever 11 movable to the different shift ranges is applied is shown as an example. However, the shift lever apparatus is not limited thereto. For example, the shift lever apparatus may be a so-called momentary-type shift lever apparatus.

Figure 5:
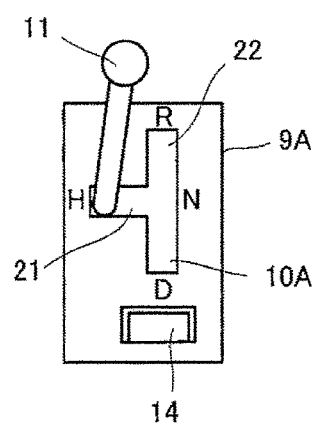
FIG. 5 is a schematic view of a shift lever apparatus according to a fourth embodiment.

FIG. 5 is a schematic view of a shift lever apparatus according to the present embodiment. Notably, the constituent elements identical with those of the first embodiment are denoted by the same symbols, and their redundant description will be omitted. As shown in FIG. 5, a shift lever apparatus 9A includes a shift lever 11, a shift path 10A for guiding the movement of the shift lever 11, an urging device (not shown) which always urges the shift lever 11 toward a predetermined neutral position, and a detection device (not shown), such as a switch, a sensor, or the like, which detects the operation of the shift lever 11.

The shift lever apparatus 9A is of a so-called shift-by-wire type, and is called a momentary-type or a joystick-type. The shift lever 11 is located at the neutral position H in an ordinary time. The shift lever 11 is configured such that the shift lever 11 can move along the shift path 10A in accordance with a driver's operation, and can be returned to the neutral position by an operator's operation or the urging force of the urging device.

The shift path 10A has a plurality of grooves which can guide the shift lever 11 to a plurality of positions. The shift path 10A is formed such that the plurality of grooves can guide the shift lever 11 to an arbitrary position in accordance with the drive's operation. Specifically, the shift path 10A has a first groove 21 extending from the neutral position H toward one side and a second groove 22 extending in the front-rear direction from the end of the first groove 21.

When the shift range detector which detects a shift range of a shift lever for the shift lever apparatus 9A detects a movement of the shift lever 11, the detector determines the range to which the shift lever 11 has moved. Specifically, when the shift lever 11 has been moved to the end of the first groove 21 (a central portion of the second groove 22), the shift range detector determines that the shift lever 11 is in the N range. When the shift lever 11 has been moved to the forward end of the second groove 22, the shift range detector determines that the shift lever 11 is in the R range. When the shift lever 11 has been moved to the rear end of the second groove 22, the shift range detector determines that the shift lever 11 is in the D range. Then, the shift range detector sends to the control unit 15 a piece of information representing the detected shift range of the shift lever 11.

Like the electric parking brake mechanisms of the first through third embodiments, an electric parking brake mechanism including such a momentary-type shift lever apparatus 9A brings the parking brake mechanism 13 into the braking state or the braking-released state in accordance with the detected shift range and the depression of the brake pedal 9. The electric parking brake mechanism according to the present embodiment achieves an action and effects similar to those of the first through third embodiments.

INDUSTRIAL APPLICABILITY

The present invention can be used in the industrial field of automobiles.

DESCRIPTION OF SYMBOLS

1: electric parking brake device
7: brake pedal
8: stop lamp switch (pedal state detector)
9, 9A: shift lever apparatus (shift range detector)
11: shift lever 13: parking brake mechanism
14: operation switch
15: control unit (controller)

The invention claimed is:

1. An electric parking brake device comprising:
   a pedal state detector which detects an operation state of a brake pedal;
   a shift range detector which detects a shift range of a shift lever;
   a parking brake mechanism which can bring a wheel into a braked state or a braking-released state;
   an operation switch which switches the parking brake mechanism to a braking state or a braking-released state; and
   a controller which controls braking operation of the parking brake mechanism in accordance with an operation of the operation switch,
   wherein when the parking brake mechanism is in the braking state and the operation switch is operated for switching to the braking-released state when the pedal state detector detects that the brake pedal is not being operated by an operator, the controller brings the parking brake mechanism into the braking-released state only when the shift range detector detects that the shift lever is in a parking range.

2. An electric parking brake device according to claim 1, further comprising a notifier which notifies a driver with a piece of information,
   wherein when the controller detects, using the pedal state detector, that the brake pedal is not depressed, the controller notifies, using the notifier, the driver with a piece of information for causing the driver to depress the brake pedal.

3. An electric parking brake device according to claim 1,
   wherein the pedal state detector includes a stop lamp switch which turns a stop lamp on when the brake pedal is depressed and turns the stop lamp off when the brake pedal is not depressed, and
   the controller determines whether or not the brake pedal is depressed by determining whether the stop lamp switch is on or off.

4. An electric parking brake device according to claim 2,
   wherein the pedal state detector includes a stop lamp switch which turns a stop lamp on when the brake pedal is depressed and turns the stop lamp off when the brake pedal is not depressed, and
   the controller determines whether or not the brake pedal is depressed by determining whether the stop lamp switch is on or off.

5. An electric parking brake device according to claim 3,
   wherein the controller notifies, using the notifier, the driver with a piece of information for causing the driver to change the shift range of the shift lever to the parking range, on the condition that the pressure of brake oil is equal to or higher than a predetermined threshold and the stop lamp switch is off.

6. An electric parking brake device according to claim 4,
   wherein the controller notifies, using the notifier, the driver with a piece of information for causing the driver to change the shift range of the shift lever to the parking range, on the condition that the pressure of brake oil is equal to or higher than a predetermined threshold and the stop lamp switch is off.

* * * * *